(12) United States Patent
Liang et al.

(10) Patent No.: US 11,270,142 B2
(45) Date of Patent: Mar. 8, 2022

(54) METHODS AND APPARATUSES FOR PROCESSING IMAGE AND IDENTITY VERIFICATION, ELECTRONIC DEVICES, AND STORAGE MEDIA

(71) Applicant: BEIJING SENSETIME TECHNOLOGY DEVELOPMENT CO., LTD., Beijing (CN)

(72) Inventors: Ding Liang, Beijing (CN); Zizhou Jia, Beijing (CN)

(73) Assignee: BEIJING SENSETIME TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/649,735

(22) PCT Filed: Dec. 24, 2018

(86) PCT No.: PCT/CN2018/123168
§ 371 (c)(1),
(2) Date: Mar. 23, 2020

(87) PCT Pub. No.: WO2019/192216
PCT Pub. Date: Oct. 10, 2019

(65) Prior Publication Data
US 2020/0320322 A1 Oct. 8, 2020

(30) Foreign Application Priority Data
Apr. 4, 2018 (CN) .......................... 201810300687.9

(51) Int. Cl.
*G06K 9/62* (2006.01)
*G06K 9/00* (2022.01)
*G06F 16/23* (2019.01)

(52) U.S. Cl.
CPC ..... *G06K 9/00926* (2013.01); *G06F 16/2379* (2019.01); *G06K 9/00892* (2013.01);
(Continued)

(58) Field of Classification Search
CPC . G06K 9/00926; G06K 9/00006–0012; G06K 9/00221–00328; G06K 9/00597–00617
See application file for complete search history.

(56) References Cited

U.S. PATENT DOCUMENTS 9,471,765 B1 * 10/2016 Setterberg .......... G06K 9/00026
2010/0097177 A1 4/2010 Chou
(Continued)

FOREIGN PATENT DOCUMENTS

CN 101303724 A 11/2008
CN 201974845 U 9/2011
(Continued)

OTHER PUBLICATIONS

"Online Fingerprint Template Improvement"; Aug. 2002; Xudong Jiang and Wee Ser; IEEE Transactions on Pattern Analysis and Machine Intelligence; vol. 24, No. 8, pp. 1121-1126.
(Continued)

*Primary Examiner* — Brian Werner
(74) *Attorney, Agent, or Firm* — Cooper Legal Group, LLC

(57) ABSTRACT

Embodiments of the present disclosure provide method for processing images and apparatuses, method for identity verifications and apparatuses, electronic devices, and storage media. The method for processing images includes: obtaining first feature data of a first user image; comparing the first feature data with at least one piece of second feature data included in a database to obtain a comparison result; and determining, according to the comparison result, whether to update the database. According to the embodi-
(Continued)

ments of the present disclosure, it is beneficial to the database to adapt to identity verification in different scenarios and changes in user's appearance generated over time, thereby improving the user experience.

19 Claims, 4 Drawing Sheets

(52) U.S. Cl.
CPC ........... *G06K 9/629* (2013.01); *G06K 9/6215* (2013.01); *G06K 9/00087* (2013.01); *G06K 9/00335* (2013.01); *G06K 9/00617* (2013.01)

(56) References Cited

U.S. PATENT DOCUMENTS

| | | | |
|---|---|---|---|
| 2019/0005217 A1* | 1/2019 | Kim | G06K 9/6202 |
| 2019/0042866 A1* | 2/2019 | Mostafa | G06K 9/00255 |
| 2019/0122024 A1* | 4/2019 | Schwartz | G06F 16/2365 |

FOREIGN PATENT DOCUMENTS

| | | |
|---|---|---|
| CN | 104680375 A | 6/2015 |
| CN | 106899567 A | 6/2017 |
| CN | 107305624 A | 10/2017 |
| CN | 107609508 A | 1/2018 |
| CN | 108573038 A | 9/2018 |
| JP | 2015069574 A | 4/2015 |

OTHER PUBLICATIONS

Second Office Action of the Chinese application No. 201810300687.9, dated Oct. 22, 2020, 18 pgs.
International Search Report in the international application No. PCT/CN2018/123168, dated Mar. 26, 2019, 2 pgs.
First Office Action of the Chinese application No. 201810300687.9, dated May 7, 2020, 20 pgs.
"Arm Swing Identification Method with Template Update for Long Term Stability", Jun. 2008, Kenji Matsuo, Fiuminori Okumura, Masadyuki Hashimoto, Atsushi Koike Akira Kubota and Yoshinori Hatori, Journal of the Institute of Electronics, Information and Communication Engineers of Japan, No. J91-B vol. 6, 12 pgs.
First Office Action of the Japanese application No. 2020-518413, dated Apr. 27, 2021, 6 pgs.
English translation of the Written Opinion of the International Search Authority in the international application No. PCT/CN2018/123168, dated Mar. 26, 2019, 5 pgs.

* cited by examiner

METHODS AND APPARATUSES FOR PROCESSING IMAGE AND IDENTITY VERIFICATION, ELECTRONIC DEVICES, AND STORAGE MEDIA

CROSS-REFERENCE TO RELATED APPLICATION

The present application claims priority to Chinese Patent Application No. 201810300687.9, filed on Apr. 4, 2018, which is incorporated herein by reference in its entirety.

TECHNICAL FIELD

Embodiments of the present disclosure relate to the technical field of methods and apparatuses for processing image, and in particular, to methods and apparatuses for processing an image and identity verification, electronic devices, and storage media.

BACKGROUND

Face verification is an emerging technology. Currently, a commonly used strategy for face verification is to store face features in a face verification database in advance. When a user starts face verification, a device obtains face features of the current user, and the face features of the current user are then compared with the face features stored in the face verification database to determine whether to unlock the device.

SUMMARY

Embodiments of the present disclosure provide the technical solutions of image processing and identity verification.

According to the first aspect of embodiments of the present disclosure, A method for processing an image is provided, including: obtaining first feature data of a first user image; comparing the first feature data with at least one piece of second feature data included in a database to obtain a comparison result; and determining, according to the comparison result, whether to update the database.

In some embodiments, the comparing the first feature data with at least one piece of second feature data included in a database to obtain a comparison result includes: determining at least one similarity between the first feature data and the at least one piece of second feature data; and obtaining the comparison result based on the at least one similarity.

In some embodiments, the obtaining the comparison result based on the at least one similarity includes: determining a maximum value in the at least one similarity as the comparison result.

In some embodiments, the determining, according to the comparison result, whether to update the database includes: in response to the comparison result being greater than or equal to a first predetermined threshold, determining to update the database.

In some embodiments, the first predetermined threshold is greater than a second predetermined threshold for determining whether a user passes image verification.

In some embodiments, the determining, according to the comparison result, whether to update the database includes: in response to the comparison result being less than the second predetermined threshold for determining whether the user passes the image verification and is greater than or equal to a third predetermined threshold, prompting the user to perform identity verification by using another verification approach different from an image verification approach; and in response to the verification in the another verification approach being passed by the user, determining to update the database.

In some embodiments, the another verification approach includes at least one of a password verification approach, a fingerprint verification approach, an iris verification approach, or a gesture verification approach.

In some embodiments, the method further includes: in response to determining to update the database, performing fusing processing on the first feature data and the at least one piece of second feature data to obtain at least one piece of updated feature data.

In some embodiments, the at least one piece of second feature data refers to multiple pieces of second feature data; and the performing fusing processing on the first feature data and the at least one piece of second feature data to obtain at least one piece of updated feature data includes: determining target feature data from the multiple pieces of second feature data based on multiple similarities between the first feature data and the multiple pieces of second feature data, and performing fusing processing on the first feature data and the target feature data to obtain fused feature data, where the at least one piece of updated feature data includes the fused feature data.

In some embodiments, the at least one piece of updated feature data further includes feature data other than the target feature data in the multiple pieces of second feature data.

In some embodiments, the at least one piece of second feature data refers to one piece of second feature data; and before the obtaining first feature data of a first user image, the method further includes: obtaining feature data of multiple second user images, and performing fusing processing on the feature data of the multiple second user images to obtain the one piece of second feature data.

In some embodiments, before the performing fusing processing on the feature data of the multiple second user images, the method further includes: performing normalization processing on the feature data of the multiple second user images.

In some embodiments, the obtaining first feature data of a first user image includes: performing feature extraction processing on the first user image to obtain the first feature data.

In some embodiments, before the performing feature extraction processing on the first user image to obtain the first feature data, the method further includes: determining whether the first user image meets a predetermined image condition; and the performing feature extraction processing on the first user image to obtain the first feature data includes: in response to the first user image meeting the predetermined image condition, performing feature extraction processing on the first user image to obtain the first feature data.

In some embodiments, the predetermined image condition includes at least one of: the first user image includes a face, image quality reaches a predetermined quality condition, the face in the first user image is in an eye-opened state, a face status meets a predetermined status condition, the face in the first user image is in a mouth-closed state, a size of a face area reaches a predetermined size condition, or a shielded part in the face area meets a predetermined shield condition.

In some embodiments, before the comparing the first feature data with at least one piece of second feature data included in a database to obtain a comparison result, the method further includes: performing normalization processing on the first feature data to obtain first feature data subjected to normalization processing; and the comparing the first feature data with at least one piece of second feature data included in a database to obtain a comparison result includes: comparing the first feature data subjected to normalization processing with at least one piece of second feature data included in the database to obtain a comparison result.

In some embodiments, the method further includes: in response to the identity verification being passed by the user, unlocking a terminal device.

In some embodiments, the first user image is a face image of the user.

According to the second aspect of embodiments of the present disclosure, A method for processing an image is provided, including: obtaining feature data of multiple second user images; performing fusing processing on the feature data of the multiple second user images to obtain second feature data; and storing the second feature data to a database for identity verification.

In some embodiments, the method further includes: obtaining first feature data of a first user image; comparing between the first feature data and the second feature data to obtain a comparison result; and determining, based on the comparison result, whether identity verification is passed.

In some embodiments, the determining, based on the comparison result, whether identity verification is passed includes: in response to the comparison result being greater than or equal to a second predetermined threshold, determining that the identity verification is passed.

In some embodiments, the method further includes: in response to the comparison result being less than the second predetermined threshold, performing identity verification by using another verification approach; and in response to the verification being passed in the another verification approach, determining that the identity verification is passed.

In some embodiments, the method further includes: in response to determining that the identity verification is passed, updating the database.

In some embodiments, the obtaining feature data of multiple second user images includes: performing feature extraction processing on each of the multiple second user images to obtain the feature data of the multiple second user images.

In some embodiments, before the performing fusing processing on the feature data of the multiple second user images to obtain second feature data, the method further includes: performing normalization processing on the feature data of each of the multiple second user images to obtain feature data subjected to normalization processing of the multiple second user images; and the performing fusing processing on the feature data of the multiple second user images to obtain second feature data includes: performing fusing processing on the feature data subjected to normalization processing of the multiple second user images to obtain the second feature data.

In some embodiments, before the performing feature extraction processing on each of the multiple second user images to obtain the feature data of the multiple second user images, the method further includes: determining whether each of the multiple second user images meets a predetermined image condition; and the performing feature extraction processing on each of the multiple second user images to obtain the feature data of the multiple second user images includes: in response to each of the multiple second user images meeting the predetermined image condition, performing feature extraction processing on each of the multiple second user images to obtain the feature data of the multiple second user images.

In some embodiments, the predetermined image condition includes at least one of: the second user image includes a face, the quality reaches a predetermined quality condition, the face is in an eye-opened state, a face status meets a predetermined status condition, the face is in a mouth-closed state, a size of a face area reaches a predetermined size condition, or a shielded part in the face area meets a predetermined shield condition.

In some embodiments, the second user image is a face image of a user.

According to the third aspect of embodiments of the present disclosure, A method for identity verification is provided, including: obtaining first biological feature data of a user; determining, based on the first biological feature data and at least one piece of second biological feature data included in a database, whether the user passes identity verification; and in response to the identity verification being passed by the user, updating the database.

In some embodiments, the obtaining first biological feature data of a user includes: obtaining a first user image; and obtaining the first biological feature data of the user based on the first user image.

In some embodiments, the determining, based on the first biological feature data and a database including at least one piece of second biological feature data, whether the user passes identity verification includes: comparing the first biological feature data with the at least one piece of second biological feature data to obtain a comparison result; and determining, based on the comparison result, whether the user passes the identity verification.

In some embodiments, the determining, based on the comparison result, whether the user passes the identity verification includes: in response to the comparison result being greater than or equal to a second predetermined threshold, determining that the user passes the identity verification; and the in response to the identity verification being passed by the user, updating the database includes: in response to the comparison result being greater than or equal to a first predetermined threshold, updating the database, where the first predetermined threshold is greater than the second predetermined threshold.

In some embodiments, the determining, based on the comparison result, whether the user passes the identity verification includes: in response to the comparison result being less than the second predetermined threshold, performing identity verification on the user by using another verification approach, and in response to the another verification approach being passed by the user, determining that the user passes the identity verification; and the in response to the identity verification being passed by the user, updating the database includes: in response to the comparison result being greater than or equal to a third predetermined threshold and being less than the second predetermined threshold, updating the database.

In some embodiments, the method further includes: in response to the identity verification being passed by the user, unlocking a terminal device or allowing a payment request of the user.

According to the fourth aspect of embodiments of the present disclosure, an image processing apparatus is provided, including: an obtaining module, configured to obtain first feature data of a first user image; a comparison module, configured to compare the first feature data with at least one piece of second feature data included in a database to obtain a comparison result; and a determination module, configured to determine, according to the comparison result, whether to update the database.

In some embodiments, the image processing apparatus includes modules and/or units for implementing the steps of the method in the first aspect or any optional embodiment of the first aspect.

According to the fifth aspect of embodiments of the present disclosure, an image processing apparatus is provided, including: a second obtaining module, configured to obtain feature data of multiple second user images; a fusion module, configured to perform fusing processing on the feature data of the multiple second user images to obtain second feature data; and a storage module, configured to store the second feature data to a database for identity verification.

In some embodiments, the image processing apparatus includes modules and/or units for implementing the steps of the method in the second aspect or any optional embodiment of the second aspect.

According to the sixth aspect of embodiments of the present disclosure, an identity verification apparatus is provided, including: a feature obtaining module, configured to obtain first biological feature data of a user; an identity verification module, configured to determine, based on the first biological feature data and at least one piece of second biological feature data included in a database, whether the user passes identity verification; and a database update module, configured to, in response to the identity verification being passed by the user, update the database.

In some embodiments, the image processing apparatus includes modules and/or units for implementing the steps of the method in the third aspect or any optional embodiment of the third aspect.

According to the seventh aspect of embodiments of the present disclosure, an electronic device is provided, including: a processor and a memory, where the memory is configured to store at least one executable instruction, and the at least one executable instruction enables the processor to execute the method for processing images according to the first aspect or any possible implementation of the first aspect; or, the at least one executable instruction enables the processor to execute the method for processing images according to the second aspect or any possible implementation of the second aspect; or the at least one executable instruction enables the processor to execute the method for identity verification according to the third aspect or any possible implementation of the third aspect.

According to the eighth aspect of embodiments of the present disclosure, a computer readable storage medium is provided, where the computer readable storage medium stores computer instructions, and the execution of the computer instructions enables a processor to execute the method according to any aspect or possible implementation thereof above.

According to the ninth aspect of embodiments of the present disclosure, a computer program product is provided, including: at least one executable instruction, where when executed by a processor, the at least one executable instruction is configured to implement the method for processing images according to the first aspect or any possible implementation of the first aspect; or, when executed by a processor, the at least one executable instruction is configured to implement the method for processing images according to the second aspect or any possible implementation of the second aspect; or, when executed by a processor, the at least one executable instruction is configured to implement the method for identity verification according to the third aspect or any possible implementation of the third aspect.

In some embodiments, the executable instructions are stored on a storage medium of the computer program product.

According to embodiments of the present disclosure, after first feature data of a first user image is obtained, the first feature data is compared with at least one piece of second feature data included in a database to obtain a comparison result, and then whether to update the database is determined according to the comparison result. It is beneficial to the database to adapt to identity verification in different scenarios and changes in user's appearance generated over time, thereby improving the user experience.

BRIEF DESCRIPTION OF THE ACCOMPANYING DRAWINGS

DETAILED DESCRIPTION

Figure 1:
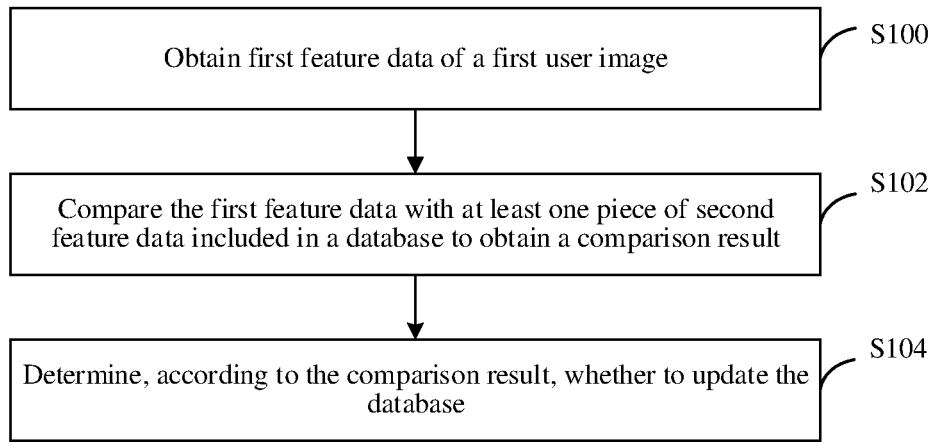
FIG. 1 is a flowchart of A method for processing an image according to embodiments of the present disclosure.

The specific implementations of embodiments of the present disclosure are further described in detail below with reference to the accompanying drawings (the same reference numerals in a plurality of accompanying drawings represent the same elements) and the embodiments. The following embodiments are intended to illustrate the present disclosure, but are not intended to limit the scope of the present disclosure.

Persons skilled in the art may understand that terms "first", "second", etc. in the embodiments of the present disclosure are only used for distinguishing different operations, devices, or modules, and do not represent any special technical meanings, and likewise do not represent necessary logic orders therebetween.

Referring to FIG. 1, a flowchart of A method for processing an image according to embodiments of the present disclosure is illustrated.

At operation S100, first feature data of a first user image is obtained.

The first user image in the embodiments of the present disclosure is an image of a user who is currently using a terminal device. A picture or a short video of the user who is currently using the terminal device may be taken by a camera of the terminal device, and the first feature data is further obtained according to the taken picture or one or more frames of images of the taken short video.

In terms of contents included in an image, the first user image includes a face image or a head image of the user, such as a front face image of the user, a front head image of the user, a front half-body image of the user, or a front whole-body image of the user. In terms of image categories, the first user image may be a static image, a video frame image in a video sequence, a synthesized image, or the like. The embodiments of the present disclosure do not define the specific implementation of the first user image.

The first feature data includes face feature data, head feature data, upper-body feature data, or body feature data, etc. In some optional embodiments, the first feature data is specified as a feature vector, for example, the first feature data is an original feature vector or a processed feature vector obtained from the first user image, which is hereinafter referred to as a first feature vector. The embodiments of the present disclosure do not define the specific implementation of the first feature data.

In some optional embodiments, the first user image is first obtained, and then feature extraction processing is performed on the obtained first user image to obtain the first feature data of the first user image. For example, the first feature data of the first user image is extracted from the first user image by means of a neural network for feature extraction processing. It is understood that, the embodiments of the present disclosure are not limited to herein, and any implementation for obtaining the first feature data from the first user image is applicable. In addition, the first feature data may also be obtained in other approaches, for example, the first feature data is received from another device. In one specific example, a server receives the first feature data from the terminal device, etc., which is not limited in the embodiments of the present disclosure.

In some optional embodiments, it is also applicable that before feature extraction processing is performed on the first user image, whether the first user image meets a predetermined image condition is determined, and the feature extraction processing is performed only in the case that the predetermined image condition is met, which, however, is not limited in the embodiments of the present disclosure.

At operation S102, the first feature data is compared with at least one piece of second feature data included in a database to obtain a comparison result.

In the embodiments of the present disclosure, at least one piece of second feature data of a registered user is stored in the database. The registered user may be considered as an owner of the terminal device or a user having the use permission of the terminal device, and the user has previously registered by identity. The at least one piece of second feature data servers as a comparison template for performing comparison with the first feature data.

In some embodiments of the present disclosure, the at least one piece of second feature data has a data type identical to or different from that of the first feature data. For example, the first feature data and the second feature data are both floating-point data or the first feature data and the second feature data are both integer feature data. In one specific example, the first feature data and the second feature data are both feature vectors, and the data type of the value in each dimension of the feature vector is a floating-point type or an integer type, which is not limited in the embodiments of the present disclosure.

In some embodiments of the present disclosure, the first feature data and the second feature data are both binary number sequences. Since a machine instruction identified and executed by the terminal device is represented by a binary number, the use of the binary number sequences for the first feature data and the second feature data may improve the speed of identity verification.

At operation S104, whether to update the database is determined according to the comparison result.

In some embodiments of the present disclosure, whether the comparison result meets a predetermined update condition is determined, where in the case that the comparison result meets the update condition, it is determined to update the database, and in the case that the comparison result does not meet the update condition, it is determined not to update the database. The predetermined update condition includes, but is not limited to, that a relationship between the comparison result and a predetermined threshold, etc. The specific contents of the predetermined condition are not limited in the embodiments of the present disclosure.

According to the embodiments of the present disclosure, after the first feature data of the first user image is obtained, the first feature data is compared with at least one piece of second feature data included in a database to obtain a comparison result, and then whether to update the database is determined according to the comparison result. It is beneficial to the database to adapt to identity verification in different scenarios and to changes in user's appearance generated over time, thereby improving the user experience.

The method for processing images in the embodiments of the present disclosure may be executed by any appropriate terminal device or server having image or data processing capabilities, where the terminal device includes but is not limited to: a camera, a terminal, a mobile terminal, a PC, a server, an in-vehicle device, an entertainment device, an advertising device, a Personal Digital Assistant (PDA), a tablet computer, a laptop computer, a handheld game console, smart glasses, a smart watch, a wearable device, a virtual display device, a display enhanced device (such as Google Glass, Oculus Rift, Hololens, Gear VR), and the like, which is not limited in the embodiments of the present disclosure.

Figure 2:
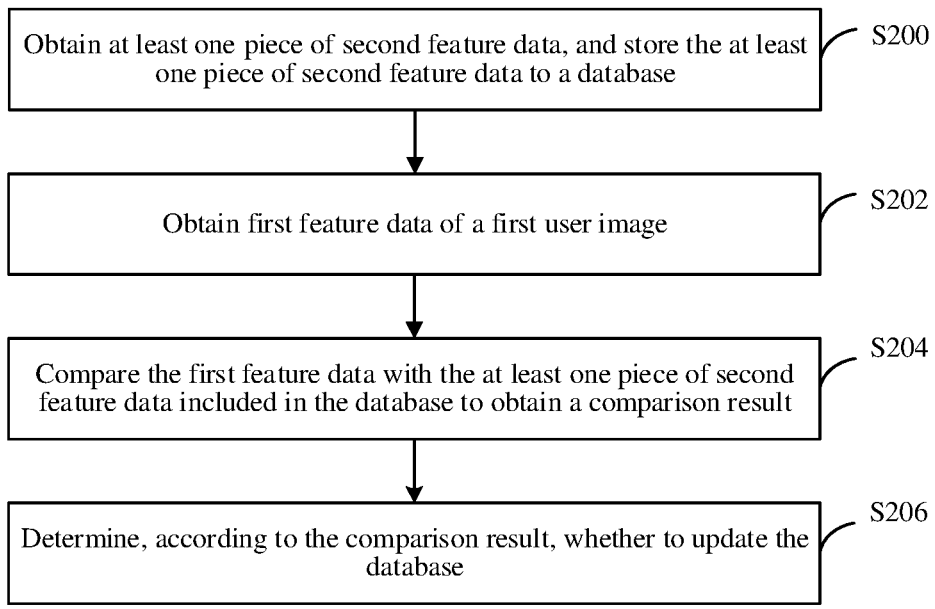
FIG. 2 is another flowchart of A method for processing an image according to embodiments of the present disclosure.

Referring to FIG. 2, another flowchart of A method for processing an image according to embodiments of the present disclosure is illustrated.

At operation S200, at least one piece of second feature data is obtained, and the at least one piece of second feature data is stored to a database.

In some embodiments, the at least one piece of second feature data is obtained in a user registration process, for example, if a terminal device receives a registration instruction of a user, the terminal device obtains the at least one piece of second feature data. However, a timing and a trigger condition of obtaining the at least one piece of second feature data are not limited in the embodiments of the present disclosure.

Specifically, a server receives at least one piece of second feature data sent by the terminal device; or, the server or the terminal device obtains feature data of multiple second user images, and obtains the at least one piece of second feature data based on the feature data of the multiple second user images.

In some embodiments, the multiple second user images are obtained by means of an internal camera or an external camera of the terminal device, or the server receives the multiple second user images sent by the terminal device. After the multiple second user images are obtained, feature extraction processing may be performed on each of the multiple second user images to obtain the feature data of each of the multiple second user images. Or, the server receives the feature data of the multiple second user images sent by the terminal device, etc. The approach of obtaining the feature data of the second user images is similar to the approach of obtaining feature data of a first user image, which is not limited in the embodiments of the present disclosure.

In some embodiments, after the feature data of the multiple second user images is obtained, the feature data of the second user images is directly determined as the second feature data. In this case, the at least one piece of second feature data specifically refers to multiple pieces of second feature data. Or, the feature data of some or all of the multiple second user images is subjected to fusing processing to obtain one or more pieces of second feature data. In one specific example, the feature data of all of the multiple second user images is subjected to fusing processing to obtain the second feature data. In this case, the at least one piece of second feature data specifically refers to one piece of second feature data. Or, other processing may be performed on the feature data of the multiple second user images to obtain the at least one piece of second feature data, which is not limited in the embodiments of the present disclosure.

In some optional embodiments, before the feature data of the multiple second user images is subjected to fusing processing, the feature data of the multiple second user images is subjected to normalization processing. In one specific example, five second user images is obtained, and feature data is extracted from each of the five second user images and then subjected to normalization processing; and average fusion in each feature dimension is performed on the feature data subjected to normalization processing of the five second user images to obtain one or more pieces of second feature data, which, however, is not limited in the embodiments of the present disclosure.

In some embodiments, after the at least one piece of second feature data is obtained, the at least one piece of second feature data is stored to a database of the terminal device or a database of the server as a comparison template.

In some embodiments, after obtaining the second user images, the terminal device or server may directly perform feature extraction processing, or may determine whether the obtained second user images meet a predetermined image condition before performing feature extraction processing, where the predetermined image condition includes one or more of: the image includes a face, image quality reaches a predetermined quality condition, the face is in an eye-opened state, a face status meets a predetermined status condition, the face is in a mouth-closed state, a size of a face area reaches a predetermined size condition, a shielded part in the face area meets a predetermined shield condition, an image illumination condition meets a predetermined illumination condition, etc. For example, face detection is performed on the second user image to determine whether the second user image includes a face, and it is determined that the predetermined image condition is met only if it is determined that the second user image includes the face. For another example, if the second user image includes the face, eye opening and closing detection is performed on the face to determine the state of at least one of two eyes. In this case, in some embodiments, if it is determined that the two eyes are both in a closed state, it is determined that the second user image does not meet the predetermined image condition, so as to prevent the user in a sleep state from being subjected to unauthorized identity verification by others, and accordingly, if it is determined that the two eyes are both in an opened state or at least one eye is in the opened state, it is determined that the second user image meets the predetermined image condition. For another example, mouth opening and closing detection is performed on the face in the image, and it is determined that the second user image meets the predetermined image condition only in the case of the mouth-closed state. For another example, it is determined that the second user image meets the predetermined image condition only in the case that a face status in the second user image is a front face or a deviation angle of the front face in one or more of three directions is within a predetermined range, where the three directions are directions corresponding to a roll-pitch-yaw coordinate system or to other types of coordinate systems. For another example, the size of a face area (such as the size of a face bounding box) in the second user image is determined, where the size is a pixel size or a proportional size, and it is determined that the predetermined image condition is met only if the size of the face area exceeds the predetermined size threshold; as one specific example, if the face area accounts for 60% of the second user image, greater than the predetermined threshold, 50%, it is determined that the second user image meets the predetermined image condition. For another example, whether the face area in the second user image is shielded, a shield proportion, or whether a specific part or area is shielded is determined, and whether the predetermined image condition is met is determined on this basis. For another example, whether an illumination condition of the second user image meets the predetermined illumination condition is determined, and it is determined that the second user image does not meet the predetermined image condition in the case of dark illumination. For another example, the image quality of the second user image is determined, such as whether the second user image is clear. Or, other conditions may also be included, which is not limited in the embodiments of the present disclosure.

At operation S202, first feature data of a first user image is obtained.

In some embodiments, the first feature data is obtained when an unlocking instruction of the user is received, or the first feature data may be obtained in another case where it is determined that an unlocking process is necessary for the terminal device. A timing and a trigger condition of obtaining the first feature data are not limited in the embodiments of the present disclosure.

In some embodiments, at S202, the approach of obtaining the first feature data is similar to the approach of obtaining the feature data of the second user images. For the sake of brevity, the details are not repeatedly described herein.

In some embodiments, the first feature data is original feature data obtained by performing feature extraction processing on the first user image, or is obtained by performing one or more processing, such as normalization and/or other processing on the original feature data, which is not limited in the embodiments of the present disclosure.

In some optional embodiments, after obtaining the first user image, the terminal device or server may directly perform feature extraction processing, or determine whether the obtained first user image meets a predetermined image condition before performing feature extraction processing on the first user image to obtain the first feature data, where the predetermined image condition includes at least one of: the image includes a face, image quality reaches a predetermined quality condition, the face in the image is in an eye-opened state, a face status meets a predetermined status condition, the face in the image is in a mouth-closed state, a size of a face area reaches a predetermined size condition, a shielded part in the face area meets a predetermined shield condition, an image illumination condition meets a predetermined illumination condition, etc. For example, face detection may be performed on the first user image, and if it is determined that the first user image does not include a face, it is determined that the first user image does not meet the predetermined image condition. For another example, if an obtained deviation between a face status of the first user image and a front direction is not within a predetermined range, such as greater than 20 degrees, it is determined that the first user image does not meet the predetermined image condition. For another example, if an image resolution of the first user image is lower than a predetermined resolution 1024×720, it is determined that the first user image does not meet the predetermined image condition. For another example, if two eyes of a person in the first user image are both in the closed state, it is determined that the first user image does not meet the predetermined image condition, etc. In this case, in some embodiment, the feature extraction processing may be performed on the first user image in the case that the first user image meets the predetermined image condition, so as to obtain the first feature data, which is not limited in the embodiments of the present disclosure.

At operation S204, the first feature data is compared with the at least one piece of second feature data included in the database to obtain a comparison result.

In some optional embodiments, at least one similarity between the first feature data and the at least one piece of second feature data may be determined; and the comparison result is obtained based on the at least one similarity. For example, the similarity between the first feature data and each of the at least one piece of second feature data may be determined, e.g., obtaining at least one similarity, which is not limited in the embodiments of the present disclosure.

In one optional implementation, the first feature data is a first feature vector, and the second feature data is a second feature vector. During similarity determination, vector dot product may be performed on the first feature vector and the second feature vector to obtain a similarity between the first feature vector and the second feature vector. Or, the similarity between the first feature data and the second feature data may be determined in another approach, which is not limited in the embodiments of the present disclosure.

During determining the comparison result based on the at least one similarity, if the at least one similarity specifically refers to one similarity, the similarity may be directly determined as the comparison result. In some embodiments, if the at least one similarity refers to multiple similarities, a maximum value in the at least one similarity is determined as the comparison result; or, the comparison result is determined by performing weighted averaging, mathematical averaging, or other processing on some or all of the at least one similarity, which is not limited in the embodiments of the present disclosure.

In some optional embodiments, before comparing the first feature data with at least one piece of second feature data included in the database, the first feature data first is subjected to normalization processing to obtain first feature data subjected to normalization processing, and the first feature data subjected to normalization processing is then compared with the at least one piece of second feature data included in the database to obtain the comparison result. By means of normalization, the first feature data subjected to normalization processing may keep identical or similar to the at least one piece of second feature data in the database in terms of data type or data format as much as possible, thereby reducing the comparison difficulty and improving the comparison efficiency.

At operation S206, whether to update the database is determined according to the comparison result.

In some optional embodiments, whether identity verification is passed may be determined according to the comparison result, and in the case that the identity verification is passed, the database is updated.

In some optional embodiments, in the case that the user passes the identity verification, the terminal device is unlocked.

In some optional embodiments of the present disclosure, one or more predetermined thresholds is set in advance, the comparison result is compared with a predetermined threshold, and whether to update the database is determined according to the relationship between the comparison result and the predetermined threshold.

In one optional implementation, the predetermined threshold set in advance includes one or more of a first predetermined threshold, a second predetermined threshold, or a third predetermined threshold, where the first predetermined threshold is greater than the second predetermined threshold for determining whether the user passes image verification, and the second predetermined threshold is greater than the third predetermined threshold.

In some optional implementations of the present disclosure, whether to update the database may be determined according to the relationship between the comparison result and one or more of the first predetermined threshold, the second predetermined threshold, and the third predetermined threshold.

Example I. in the case that the comparison result is greater than or equal to the first predetermined threshold, it is determined to update the database. For example, if the comparison result is 0.8 and the first predetermined threshold is 0.6, where the comparison result is greater than the first predetermined threshold, it is determined to update the database.

In this case, it is applicable to only set the first predetermined threshold, e.g., in the case that the comparison result is less than the first predetermined threshold, it is determined not to update the database. Or, moreover, another predetermined threshold may also be set, for example, the second predetermined threshold may be set. In one optional example, in the case that the comparison result is less than the first predetermined threshold and is greater than or equal to the second predetermined threshold, it is determined that the image verification is passed but the database is not updated. For example, if the comparison result is 0.4, the first predetermined threshold is 0.6, and the second predetermined threshold is 0.3, where the comparison result is less than the first predetermined threshold and is greater than the second predetermined threshold, the terminal device is unlocked, payment is allowed, or another corresponding operation after the pass of the identity verification is performed, while the database is not updated. Or, the second predetermined threshold and the third predetermined threshold may be set, as described in example II below, which is not limited in the embodiments of the present disclosure.

Example II, in the case that the comparison result is less than the second predetermined threshold and is greater than or equal to the third predetermined threshold, the user is prompted to perform identity verification by using another verification approach (or referred to as a second verification approach) different from the image verification approach (or referred to as a first verification approach). In some embodiments, in the case that the user passes the verification in another verification approach, it is determined to update the database. In this case, in some embodiments, if the user does not pass the verification in another verification approach, the database is not updated. Or, in some embodiments, in the case that the verification is passed in another verification approach and the comparison result is less than the third predetermined threshold, it is determined not to update the database. Or, another predetermined threshold is further used to determine whether to update the database, which is not limited in the embodiments of the present disclosure.

The another verification approach in the embodiments of the present disclosure includes at least one of: a password verification approach, a fingerprint verification approach, an iris verification approach, or a gesture verification approach, or an approach other than those listed above, which is not specifically limited in the embodiments of the present disclosure. For example, the comparison result is 0.1, the second predetermined threshold is 0.3, and the third predetermined threshold is −0.1, where the comparison result is less than the second predetermined threshold and is greater than the third predetermined threshold, then in the case that the comparison result is less than the second predetermined threshold and is greater than or equal to the third predetermined threshold, the user is prompted to input a password to perform identity verification, and in the case that the password input by the user is correct, it is determined to update the database.

The second predetermined threshold is used for determining whether the user passes the image verification, for example, the second predetermined threshold is used for determining whether face verification is passed. In the case that the comparison result is greater than or equal to the second predetermined threshold, it is determined that the image verification is passed. However, in consideration of factors such as an error rate of image identification or stability of image verification, in the embodiments of the present disclosure, the first predetermined threshold is set to be greater than the second predetermined threshold, and the database is updated only if the comparison result is greater than or equal to the first predetermined threshold, thereby avoiding reduced accuracy of image verification caused by the use of an inappropriate image to update the database and thus improving the user experience.

The another verification approach in the embodiments of the present disclosure is used for determining whether the current user is a registered user of the terminal device, e.g., determining whether the current user is an owner of the terminal device or a user having the use permission of the terminal device. Therefore, in the case that the current user passes the another verification approach and the comparison result is greater than or equal to the third predetermined threshold, there is a great possibility that the current user is the registered user, and the database may still be updated, thereby avoiding the failure of image verification caused by changes in user's appearance and thus facilitating the improvement of the user experience.

In some embodiments, the identity verification process is used for face unlocking. In this case, after the pass of the identity verification, a display screen of the terminal device is switched from a locked interface to a user unlocked interface, such as, for example, displaying an application program list or a user-defined or default unlocked interface image, and in some embodiments, the user has the permission of using some or all of application programs of the terminal device, etc., which is not limited in the embodiments of the present disclosure.

In some embodiments, the identity verification process is used for face payment. In this case, after the pass of the identity verification, the user is allowed to perform payment or send a payment request to a payment server, which is not limited in the embodiments of the present disclosure.

In some optional implementations of the present disclosure, in the case of determining to update the database, the at least one piece of second feature data in the database may be updated, and the update includes: performing fusing processing on the first feature data and the at least one piece of second feature data to obtain at least one piece of updated feature data. In the embodiments of the present disclosure, feature fusion is performed in multiple approaches, and two exemplary fusion approaches are provided as follows.

Approach I: in the case that the at least one piece of second feature data refers to one piece of second feature data, the first feature data and the second feature data are subjected to fusing processing to obtain updated feature data.

Approach II: in the case that the at least one piece of second feature data refers to multiple pieces of second feature data, the first feature data and the at least one piece of second feature data in the multiple pieces of second feature data are subjected to fusing processing to obtain multiple pieces of updated feature data.

The first feature data is subjected to fusing processing with some or all feature data in multiple pieces of second feature data. In one optional example, target feature data is selected from the multiple pieces of second feature data, and the first feature data is subjected to fusing processing with the target feature data. In this case, in some embodiments, the at least one piece of updated feature data includes fused feature, and further includes the other second feature data that is not fused, e.g., feature data other than the target feature data in the multiple pieces of second feature data.

In the embodiments of the present disclosure, the target feature data may be selected in multiple approaches. For example, the target feature data may be selected randomly; or the target feature data may be selected according to the time when the feature data is added to the database, where in one optional example, the second feature data that is added to the database at first or at last may be determined as the target feature data; or the target feature data may be selected according to a history comparison value (such as the similarity) of the second feature data, where in one optional example, the history comparison values of each piece of second feature data may be averaged, and the second feature data having a minimum average comparison value obtained is determined as the target feature data, or the second feature data having the least history comparison value in the multiple pieces of second feature data with respect to a particular value is determined as the target feature data, etc.; or the target feature data may be determined from the multiple pieces of second feature data based on multiple similarities between the first feature data and the multiple pieces of second feature data. For example, the multiple similarities between the first feature data S and the multiple pieces of second feature data S1, S2, and S3 are respectively X1, X2, and X3, if the similarity X1 is greater than X2 and the similarity X2 is greater than X3, the second feature data S3 corresponding to the minimum similarity X3 is determined as the target feature data, and the first feature data S and the second feature data S3 are subjected to fusing processing to obtain fused feature data R. In this case, the updated feature data includes the fused feature data R, and the second feature data S1 and S2.

In some optional implementations of the present disclosure, feature fusion is performed based on the first feature data, the second feature data (or the target feature data), and a weight attenuation coefficient, e.g., feature fusion is performed according to formula $B''=B \times a+(1-a) \times B'$ where $B''$ is the updated feature data, B is the second feature data or the target feature data, a is the weight attenuation coefficient greater than 0 and less than 1, and B' is the first feature data.

In some embodiments, a second database is updated by means of data coverage or replacement, which is not limited in the embodiments of the present disclosure.

In some optional implementations of the present disclosure, relationships between the comparison result and one or more of the first predetermined threshold, the second predetermined threshold, and the third predetermined threshold include the following two situations, and corresponding operations are separately performed in respective conditions.

According to the embodiments of the present disclosure, after first feature data of a first user image is obtained, the first feature data is compared with at least one piece of second feature data included in a database to obtain a comparison result, and then whether to update the database is determined according to the comparison result. It is beneficial to the database to adapt to identity verification in different scenarios and changes in user's appearance generated over time, thereby improving the user experience.

The first user image and the second user image in the embodiments of the present disclosure both include face images of the user, or the first user image and the second user image are head images of the user, upper-body images of the user, whole-body images of the user, or the like, which is not limited in the embodiments of the present disclosure.

It should be understood that in the embodiments of the present disclosure, the feature data refers to various biological feature data, such as face feature data, body feature data, iris feature data, fingerprint feature data, etc., which is not limited in the embodiments of the present disclosure. Accordingly, the feature data is obtained based on different types of sensors, such as a visible light sensor, a 3D image sensor, a fingerprint sensor, or an iris sensor. The approach of obtaining the feature data is not limited in the embodiments of the present disclosure.

Figure 3:
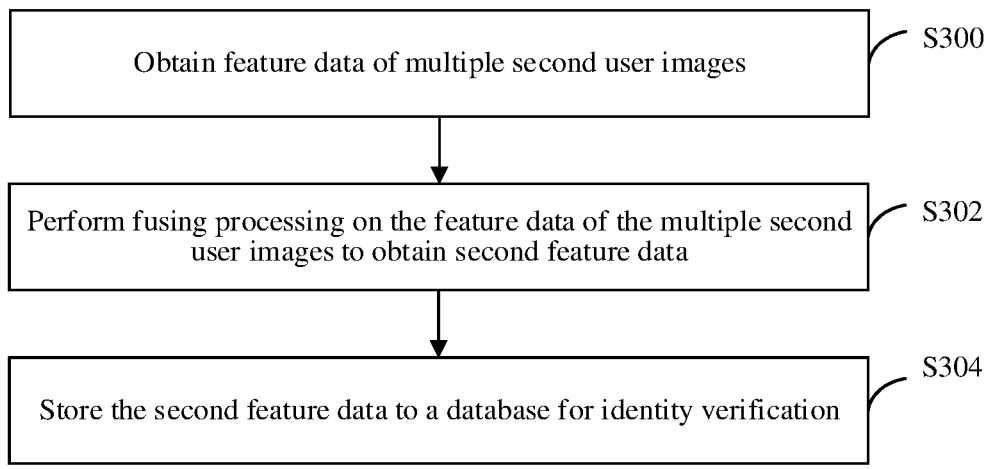
FIG. 3 is yet another flowchart of A method for processing an image according to embodiments of the present disclosure.

Referring to FIG. 3, yet another flowchart of A method for processing an image according to embodiments of the present disclosure is illustrated.

At operation S300, feature data of multiple second user images is obtained.

In some optional implementations, feature extraction processing is performed on each of the multiple second user images to obtain the feature data of the multiple second user images.

At operation S302, the feature data of the multiple second user images is subjected to fusing processing to obtain second feature data.

In some optional implementations, the feature data of each of the multiple second user images is subjected to normalization processing to obtain the feature data subjected to normalization processing of the multiple second user images. When the feature data of the multiple second user images is subjected to fusing processing, the feature data subjected to normalization processing of the multiple second user images is subjected to fusing processing to obtain the second feature data.

In some optional implementations, after the second user images are obtained, whether the second user images meet a predetermined image condition may be first determined, where in the case that the second user images meet the predetermined image condition, feature extraction processing is performed on each of the multiple second user images to obtain the feature data of the multiple second user images, and in the case that the second user images do not meet the predetermined image condition, a user is prompted of a result that the second images do not meet the predetermined image condition. The predetermined image condition includes at least one of: the image includes a face, the quality reaches a predetermined quality condition, the face is in an eye-opened state, a face status meets a predetermined status condition, the face is in a mouth-closed state, a size of a face area reaches a predetermined size condition, or a shielded part in the face area meets a predetermined shield condition.

At operation S304, the second feature data is stored to a database for identity verification.

In some optional implementations, the second feature data in the database further is used to perform identity verification. For example, first feature data of a first user image is first obtained, where refer to the contents of operation S300 for the specific process of obtaining the first feature data. Details are not repeatedly described herein. The first feature data is then compared with the second feature data stored in the database to obtain a comparison result, and whether identity verification is passed is determined based on the comparison result. During determining whether the identity verification is passed, the comparison result is compared with at least one predetermined threshold, where if the comparison result is greater than or equal to a second predetermined threshold, it is determined that the identity verification is passed by using the first user image, and if the comparison result is less than the second predetermined threshold, the identity verification is performed by using another verification approach, and if the verification is passed in the another verification approach, it is determined that the identity verification is passed by using the another verification approach.

In some optional implementations, in the case of determining that the identity verification is passed, the database is updated by using the first feature data of the first user image, for example, the second feature data is updated by using the first feature data. The specific contents of updating the database are not limited in the embodiments of the present disclosure.

Some or all contents in operation S200 are implemented by means of execution processes of operations S300 to S304. Refer to the related contents in operation S200 for the specific execution processes, which will not be repeated here.

Figure 4:
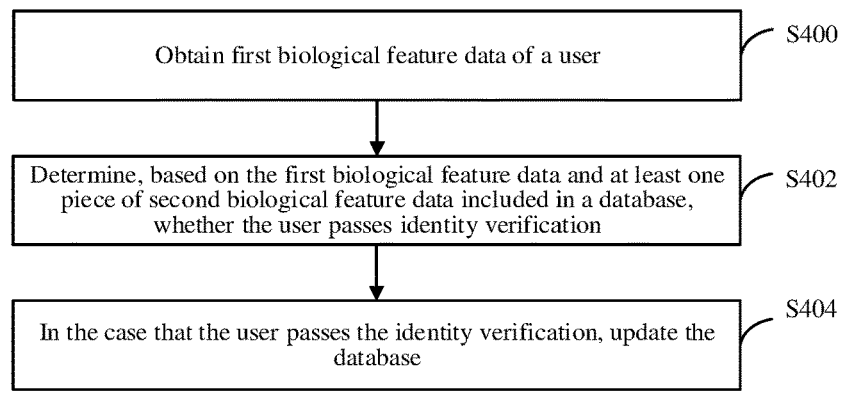
FIG. 4 is a flowchart of A method for identity verification according to embodiments of the present disclosure.

Referring to FIG. 4, a flowchart of A method for identity verification according to embodiments of the present disclosure is illustrated.

At operation S400, first biological feature data of a user is obtained.

The first biological feature data includes but is not limited to: face feature data, body feature data, iris feature data, fingerprint feature data, etc., which is not limited in the embodiments of the present disclosure.

In some optional implementations, a first user image may be obtained, and the first biological feature data of the user is obtained based on the first user image. Specifically, feature extraction processing is performed on the first user image to obtain the first biological feature data of the user. In the embodiments of the present disclosure, the first biological feature data may be obtained in another approach. The technical means used for obtaining the first biological feature data is not limited in the embodiments of the present disclosure.

At operation S402, whether the user passes identity verification is determined based on the first biological feature data and at least one piece of second biological feature data included in a database.

In some optional implementations, the first biological feature data may be compared with the at least one piece of second biological feature data to obtain a comparison result, and whether the user passes the identity verification is determined based on the comparison result. The at least one piece of second biological feature data serves as a comparison template for biological feature data comparison. In a specific comparison process, the first biological feature data is compared with each of the at least one piece of second biological feature data to obtain at least one comparison result, and then a comparison result is determined from the at least one comparison result, for example, a comparison result with the maximum value is determined. Or, the first biological feature data is compared with one of the at least one piece of second biological feature data to obtain a comparison result. After the comparison result is obtained, then the comparison result is compared with a predetermined threshold, and whether the user passes identity verification is determined according to the comparison result. For example, in the case that the comparison result is greater than or equal to a second predetermined threshold, it is determined that the user passes the identity verification, and in the case that the comparison result is less than the second predetermined threshold, identity verification is performed on the user by using another verification approach, and in the case that the user passes in the another verification approach, it is determined that the user passes the identity verification. In the embodiments of the present disclosure, refer to the related contents in operation S206 for the technical contents concerning determining whether the user passes the identity verification. Details are not repeatedly described herein.

At operation S404, in the case that the user passes the identity verification, the database is updated.

In some optional implementations, in the case that the comparison result is greater than or equal to a first predetermined threshold, the database is updated, where the first predetermined threshold is greater than the second predetermined threshold. In the case that the comparison result is greater than or equal to a third predetermined threshold and is less than the second predetermined threshold, the database is updated. In the embodiments of the present disclosure, refer to the related contents in operation S206 for the technical contents concerning updating the database. Details are not repeatedly described herein.

In addition to this, in the case that the user passes the identity verification, a terminal device may further be unlocked or a payment request of the user is allowed.

In some optional implementations, in the case that the user does not pass the identity verification, the user may further be prompted that the identity verification does not pass, etc.

Some or all contents in operations S202 to S206 are implemented by means of execution processes of operations S400 to S404. Refer to the related contents in operations S202 to S206 for the specific execution processes, which will not be repeated here.

Figure 5:
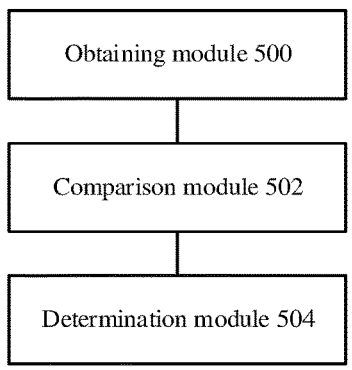
FIG. 5 is a schematic structural diagram of an image processing apparatus according to embodiments of the present disclosure.

Referring to FIG. 5, a schematic structural diagram of an image processing apparatus according to embodiments of the present disclosure is illustrated.

The image processing apparatus provided in the embodiments of the present disclosure includes: an obtaining module 500, configured to obtain first feature data of a first user image; a comparison module 502, configured to compare the first feature data with at least one piece of second feature data included in a database to obtain a comparison result; and a determination module 504, configured to determine, according to the comparison result, whether to update the database.

The image processing apparatus in the embodiments of the present disclosure is used for implementing the corresponding method for processing images in the embodiments above, and has the beneficial effects of the corresponding method embodiments. Details are not repeatedly described herein.

Figure 6:
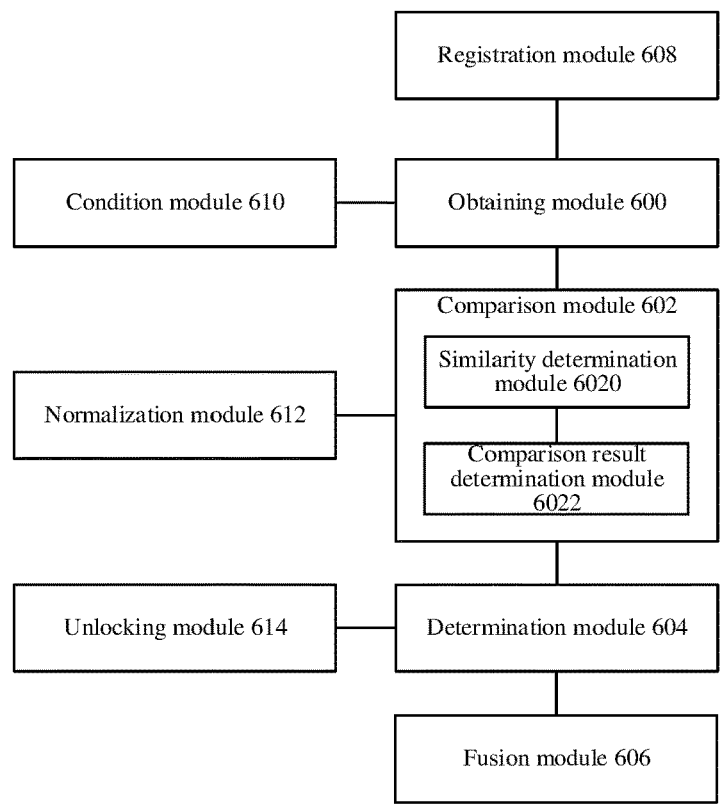
FIG. 6 is another schematic structural diagram of an image processing apparatus according to embodiments of the present disclosure.

Referring to FIG. 6, another schematic structural diagram of an image processing apparatus according to embodiments of the present disclosure is illustrated.

The image processing apparatus provided in the embodiments of the present disclosure includes: an obtaining module 600, configured to obtain first feature data of a first user image; a comparison module 602, configured to compare the first feature data with at least one piece of second feature data included in a database to obtain a comparison result; and a determination module 604, configured to determine, according to the comparison result, whether to update the database.

In some embodiments, the comparison module 602 includes: a similarity determination module 6020, configured to determine at least one similarity between the first feature data and the at least one piece of second feature data; and a comparison result determination module 6022, configured to obtain the comparison result based on the at least one similarity.

In some embodiments, the comparison result determination module 6022 is configured to determine a maximum value in the at least one similarity as the comparison result.

In some embodiments, the determination module 604 is configured to, in the case that the comparison result is greater than or equal to a first predetermined threshold, determine to update the database.

In some embodiments, the first predetermined threshold is greater than a second predetermined threshold for determining whether a user passes image verification.

In some embodiments, the determination module 604 is configured to, in the case that the comparison result is less than the second predetermined threshold for determining whether the user passes the image verification and is greater than or equal to a third predetermined threshold, prompt the user to perform identity verification by using another verification approach different from an image verification approach; and in the case that the user passes the verification in the another verification approach, determine to update the database.

In some embodiments, the another verification approach includes at least one of a password verification approach, a fingerprint verification approach, an iris verification approach, or a gesture verification approach.

In some embodiments, the image processing apparatus provided in the embodiments of the present disclosure further includes: a fusion module 606, configured to, in the case of determining to update the database, perform fusing processing on the first feature data and the at least one piece of second feature data to obtain at least one piece of updated feature data.

In some embodiments, the at least one piece of second feature data refers to multiple pieces of second feature data; and the fusion module 606 is configured to determine target feature data from the multiple pieces of second feature data based on multiple similarities between the first feature data and the multiple pieces of second feature data, and perform fusing processing on the first feature data and the target feature data to obtain fused feature data, where the at least one piece of updated feature data includes the fused feature data.

In some embodiments, the at least one piece of updated feature data further includes feature data other than the target feature data in the multiple pieces of second feature data.

In some embodiments, the at least one piece of second feature data refers to one piece of second feature data; and the image processing apparatus provided in the embodiments of the present disclosure further includes: a registration module 608, configured to, before the obtaining module 600 obtains the first feature data of the first user image, obtain feature data of multiple second user images, and perform fusing processing on the feature data of the multiple second user images to obtain the one piece of second feature data.

In some embodiments, the registration module 608 is further configured to, before performing fusing processing on the feature data of the multiple second user images, perform normalization processing on the feature data of the multiple second user images.

In some embodiments, the obtaining module 600 is configured to perform feature extraction processing on the first user image to obtain the first feature data.

In some embodiments, the image processing apparatus provided in the embodiments of the present disclosure further includes: a condition module 610, configured to, before the obtaining module 600 performs feature extraction processing on the first user image to obtain the first feature data, determine whether the first user image meets a predetermined image condition; and the obtaining module 600 is configured to, in the case that the first user image meets the predetermined image condition, perform feature extraction processing on the first user image to obtain the first feature data.

In some embodiments, the predetermined image condition includes at least one of: the image includes a face, image quality reaches a predetermined quality condition, the face in the image is in an eye-opened state, a face status meets a predetermined status condition, the face in the image is in a mouth-closed state, a size of a face area reaches a predetermined size condition, or a shielded part in the face area meets a predetermined shield condition.

In some embodiments, the image processing apparatus provided in the embodiments of the present disclosure further includes: a normalization module 612, configured to, before the comparison module 602 compares the first feature data with at least one piece of second feature data included in the database to obtain the comparison result, perform normalization processing on the first feature data to obtain first feature data subjected to normalization processing, and the comparison module 602 is configured to compare the first feature data subjected to normalization processing with the at least one piece of second feature data included in the database to obtain the comparison result.

In some embodiments, the image processing apparatus provided in the embodiments of the present disclosure further includes: an unlocking module 614, configured to, in the case that the user passes the identity verification, unlock a terminal device.

In some embodiments, the first user image is a face image of the user.

The image processing apparatus in the embodiments of the present disclosure is used for implementing the corresponding method for processing images in the embodiments above, and has the beneficial effects of the corresponding method embodiments. Details are not repeatedly described herein.

Figure 7:
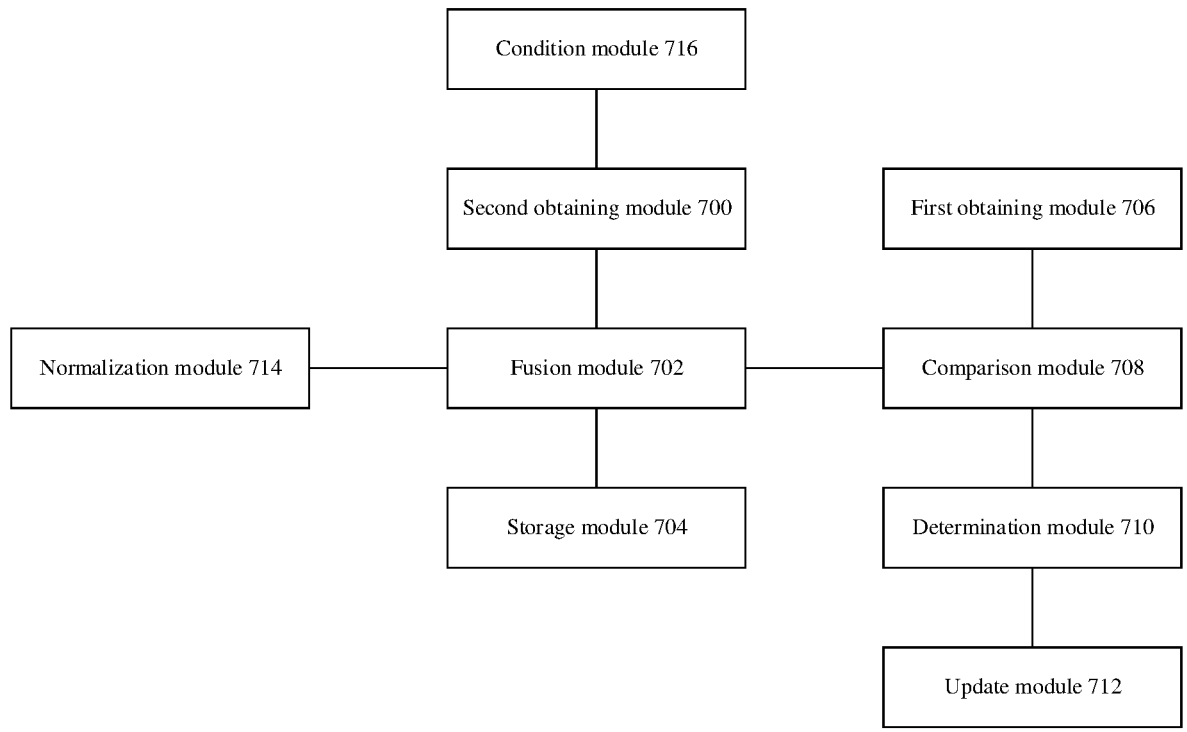
FIG. 7 is yet another schematic structural diagram of an image processing apparatus according to embodiments of the present disclosure.

Referring to FIG. 7, yet another schematic structural diagram of an image processing apparatus according to embodiments of the present disclosure is illustrated.

An image processing apparatus provided in the embodiments of the present disclosure includes: a second obtaining module 700, configured to obtain feature data of multiple second user images; a fusion module 702, configured to perform fusing processing on the feature data of the multiple second user images to obtain second feature data; and a storage module 704, configured to store the second feature data to a database for identity verification.

In some embodiments, the image processing apparatus provided in the embodiments of the present disclosure further includes: a first obtaining module 706, configured to obtain first feature data of a first user image; a comparison module 708, configured to perform comparison processing between the first feature data and the second feature data to obtain a comparison result; and a determination module 710, configured to determine, based on the comparison result, whether identity verification is passed.

In some embodiments, the determination module 710 is configured to, if the comparison result is greater than or equal to a second predetermined threshold, determine that the identity verification is passed.

In some embodiments, the determination module 710 is further configured to, if the comparison result is less than the second predetermined threshold, perform identity verification by using another verification approach; and if the verification is passed in the another verification approach, determine that the identity verification is passed. In some embodiments, the image processing apparatus provided in the embodiments of the present disclosure further includes: an update module 712, configured to, in the case that the identity verification is passed, update the database.

In some embodiments, a second obtaining module 700 is configured to perform feature extraction processing on each of the multiple second user images to obtain the feature data of the multiple second user images.

In some embodiments, the imaging processing apparatus provided in the embodiments of the present disclosure further includes: a normalization module 714, configured to, before the fusion module 702 performs the fusing processing on the feature data of the multiple second user images to obtain the second feature data, perform normalization processing on the feature data of each of the multiple second user images to obtain feature data subjected to normalization processing of the multiple second user images; and the fusion module 702 is configured to perform fusing processing on the feature data subjected to normalization processing of the multiple second user images to obtain the second feature data.

In some embodiments, the image processing apparatus provided in the embodiments of the present disclosure further includes: a condition module 716, configured to, before the second obtaining module 700 performs feature extraction processing on each of the multiple second user images to obtain the feature data of the multiple second user images, determine whether the second user images meet a predetermined image condition; and the second obtaining module 700 is configured to, in the case that the second user images meet the predetermined image condition, perform feature extraction processing on each of the multiple second user images to obtain the feature data of the multiple second user images.

In some embodiments, the predetermined image condition includes at least one of: the image includes a face, the quality reaches a predetermined quality condition, the face is in an eye-opened state, a face status meets a predetermined status condition, the face is in a mouth-closed state, a size of a face area reaches a predetermined size condition, or a shielded part in the face area meets a predetermined shield condition.

In some embodiments, the second user image is a face image of a user.

The image processing apparatus in the embodiments of the present disclosure is used for implementing the corresponding method for processing images in the embodiments above, and has the beneficial effects of the corresponding method embodiments. Details are not repeatedly described herein.

Figure 8:
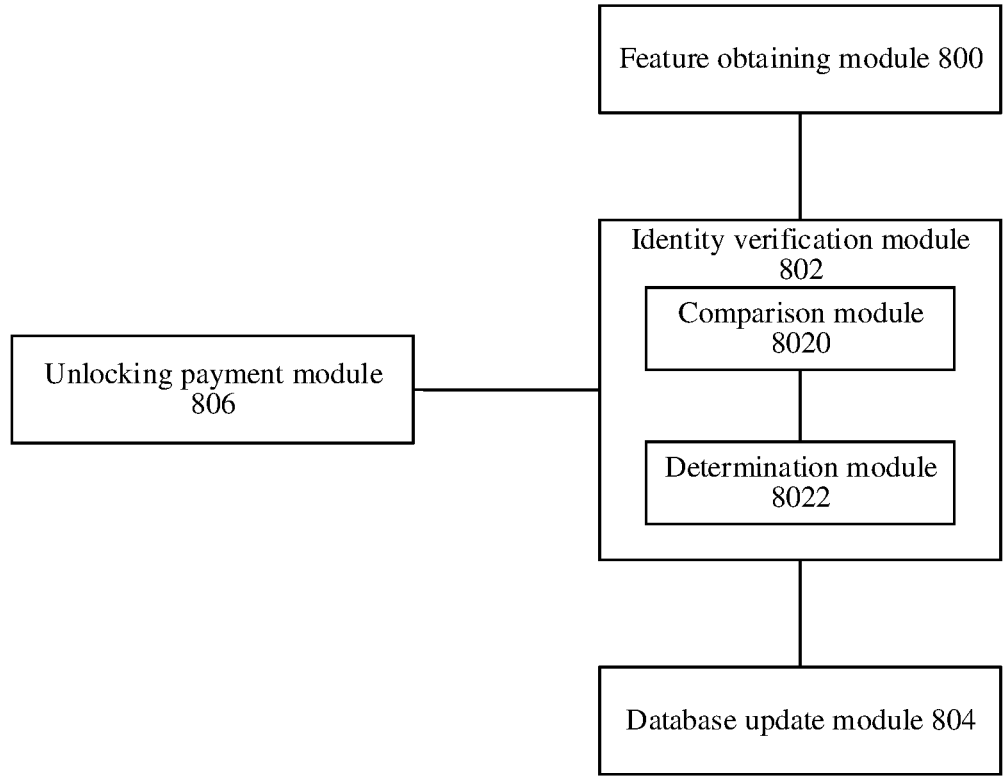
FIG. 8 is a schematic structural diagram of an identity verification apparatus according to embodiments of the present disclosure.

Referring to FIG. 8, a schematic structural diagram of an identity verification apparatus according to embodiments of the present disclosure is illustrated.

An identity verification apparatus provided in the embodiments of the present disclosure includes: a feature obtaining module 800, configured to obtain first biological feature data of a user; an identity verification module 802, configured to determine, based on the first biological feature data and at least one piece of second biological feature data included in a database, whether the user passes identity verification; and a database update module 804, configured to, in the case that the user passes the identity verification, update the database.

In some embodiments, the feature obtaining module 800 is configured to obtain a first user image, and obtain the first biological feature data of the user based on the first user image.

In some embodiments, the identity verification module 802 includes: a comparison module 8020, configured to compare the first biological feature data with the at least one piece of second biological feature data to obtain a comparison result, and a determination module 8022, configured to determine, based on the comparison result, whether the user passes the identity verification.

In some embodiments, the determination module 8022 is configured to, in the case that the comparison result is greater than or equal to a second predetermined threshold, determine that the user passes the identity verification; and the database update module 804 is configured to, in the case that the comparison result is greater than or equal to a first predetermined threshold, update the database, where the first predetermined threshold is greater than the second predetermined threshold.

In some embodiments, the determination module 8022 is configured to, in the case that the comparison result is less than the second predetermined threshold, perform identity verification on the user by using another verification approach, and in the case that the user passes in the another verification approach, determine that the user passes the identity verification; and the database update module 804 is configured to, in the case that the comparison result is greater than or equal to a third predetermined threshold and is less than the second predetermined threshold, update the database.

In some embodiments, the identity verification apparatus provided in the embodiments of the present disclosure further includes: an unlocking payment module 806, configured to, in the case that the user passes the identity verification, unlock a terminal device or allow a payment request of the user.

The identity verification apparatus in the embodiments of the present disclosure is used for implementing the corresponding method for identity verification in the embodiments above, and has the beneficial effects of the corresponding method embodiments. Details are not repeatedly described herein.

Figure 9:
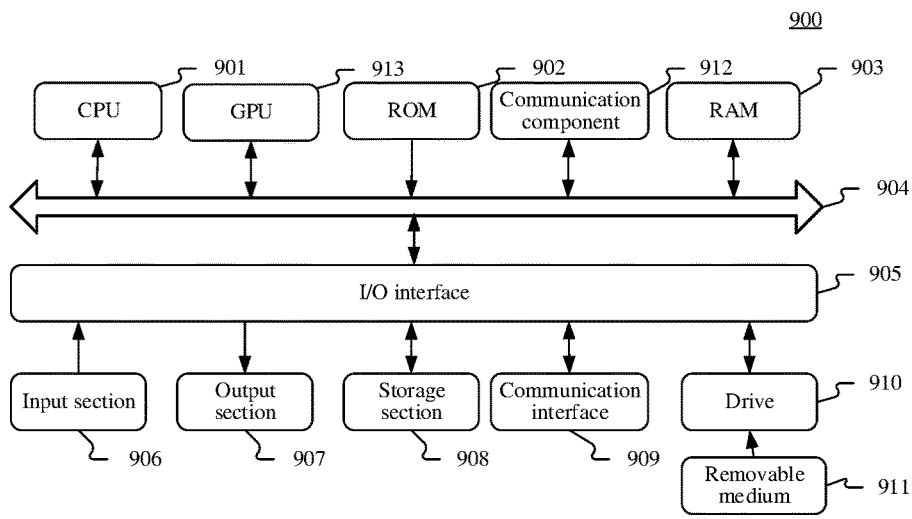
FIG. 9 is a schematic structural diagram of an electronic device according to embodiments of the present disclosure.

Embodiments of the present disclosure further provide an electronic device which, for example, is a mobile terminal, a Personal Computer (PC), a tablet computer, a server, and the like. Referring to FIG. 9 below, a schematic structural diagram of an electronic device 900 suitable for implementing the image processing apparatus according to the embodiments of the present disclosure is illustrated. As shown in FIG. 9, the electronic device 900 includes a memory and a processor. Specifically, the electronic device 900 includes one or more processors, a communication element, and the like. The one or more processors are, for example, one or more Central Processing Units (CPUs) 901, and/or one or more Graphic Processing Units (GPUs) 913, or the like, and the processors execute various appropriate actions and processing according to executable instructions stored in a Read-Only Memory (ROM) 902 or executable instructions loaded from a storage section 908 to a Random Access Memory (RAM) 903. The communication element includes a communication component 912 and/or a communication interface 909. The communication component 912 includes but is not limited to a network card, and the network card includes but is not limited to an InfiniBand (IB) network card. The communication interface 909 includes a communication interface of a network interface card such as an LAN card and a modem, and the communication interface 909 performs communication processing via a network such as the Internet.

The processors communicate with the ROM 902 and/or the RAM 903 to execute executable instructions, are connected to the communication component 912 by means of a communication bus 904, and communicate with other target devices by means of the communication component 912, so as to complete operations corresponding to any method for processing images provided in the embodiments of the present disclosure, such as obtaining first feature data of a first user image, comparing the first feature data with at least one piece of second feature data included in a database to obtain a comparison result, and determining, according to the comparison result, whether to update the database.

In addition, the RAM 903 further stores programs and data required for operations of an apparatus. The CPU 901 or GPU 913, the ROM 902, and the RAM 903 are connected to each other by means of the communication bus 904. In the presence of the RAM 903, the ROM 902 is an optional module. The RAM 903 stores executable instructions, or writes the executable instructions to the ROM 902 during running, where the executable instructions enable the processor to perform corresponding operations of the foregoing communication method. An Input/Output (I/O) interface 905 is also connected to the communication bus 904. The communication component 912 is integrated, or is configured to have multiple sub-modules (for example, multiple IB network cards) linked on the communication bus.

The following parts are connected to the I/O interface 905: an input section 906 including a keyboard, a mouse and the like; an output section 907 including a Cathode-Ray Tube (CRT), a Liquid Crystal Display (LCD), a loudspeaker and the like; a storage section 908 including hardware and the like; and the communication interface 909 of the network interface card such as the LAN card and the modem. A drive 910 is also connected to the I/O interface 905 according to requirements. A removable medium 911 such as a magnetic disk, an optical disk, a magneto-optical disk, and a semiconductor memory is installed on the drive 910 according to requirements, so that a computer program read from the removable medium is installed on the storage section 908 according to requirements.

It should be noted that, the architecture illustrated in FIG. 9 is merely an optional implementation. During specific practice, the number and types of the parts in FIG. 9 may be selected, decreased, increased, or replaced according to actual requirements. Different functional parts may be separated or integrated or the like. For example, the GPU and the CPU may be separated, or the GPU may be integrated on the CPU, and the communication element may be separated from or integrated on the CPU or the GPU or the like. These alternative implementations all fall within the scope of protection of the present disclosure.

The electronic device according to the embodiments of the present disclosure is configured to implement the corresponding method for processing images in the foregoing embodiments. The parts in the electronic device may be configured to perform the operations in the foregoing method embodiments. For example, the method for processing images described above is implemented by the processor of the electronic device invoking related instructions stored in the memory. For the purpose of concision, details are not repeatedly described herein.

The process described above with reference to the flowchart according to the embodiments of the present disclosure is implemented as a computer program product. For example, the embodiments of the present disclosure include a computer program product, which includes a computer program tangibly included in a machine-readable medium. The computer program includes program codes for executing a method shown in the flowchart. The program code includes corresponding instructions for correspondingly executing operations of the methods provided by the embodiments of the present disclosure, such as obtaining first feature data of a first user image, comparing the first feature data with at least one piece of second feature data included in a database to obtain a comparison result, and determining, according to the comparison result, whether to update the database. In such embodiments, the computer program is downloaded and installed from a network through the communication element and/or installed from the removable medium 911. When the computer program is executed by the processor, functions provided in the method according to the embodiments of the present disclosure are executed.

Figure 10:
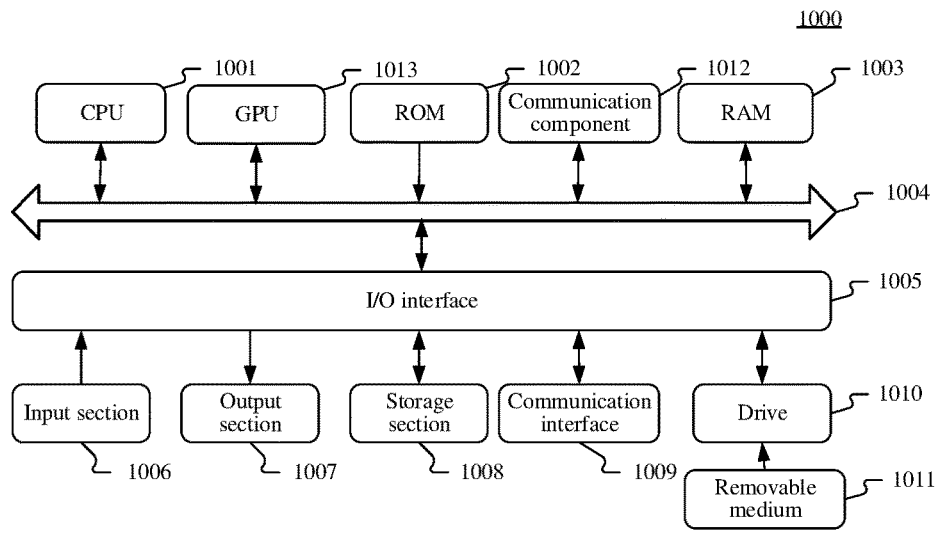
FIG. 10 is another schematic structural diagram of an electronic device according to embodiments of the present disclosure.

Embodiments of the present disclosure further provide an electronic device which, for example, is a mobile terminal, a Personal Computer (PC), a tablet computer, a server, and the like. Referring to FIG. 10 below, a schematic structural diagram of an electronic device 1000 suitable for implementing the image processing apparatus according to the embodiments of the present disclosure is illustrated. As shown in FIG. 10, the electronic device 1000 includes a memory and a processor. Specifically, the electronic device 1000 includes one or more processors, a communication element, and the like. The one or more processors are, for example, one or more Central Processing Units (CPUs) 1001, and/or one or more Graphic Processing Units (GPUs) 1013, or the like, and the processors execute various appropriate actions and processing according to executable instructions stored in a Read-Only Memory (ROM) 1002 or executable instructions loaded from a storage section 1008 to a Random Access Memory (RAM) 1003. The communication element includes a communication component 1012 and/or a communication interface 1009. The communication component 1012 includes but is not limited to a network card, and the network card includes but is not limited to an InfiniBand (IB) network card. The communication interface 1009 includes a communication interface of a network interface card such as an LAN card and a modem, and the communication interface 1009 performs communication processing via a network such as the Internet.

The processors communicate with the ROM 1002 and/or the RAM 1003 to execute executable instructions, are connected to the communication component 1012 by means of a communication bus 1004, and communicate with other target devices by means of the communication component 1012, so as to complete operations corresponding to any method for processing images provided in the embodiments of the present disclosure, such as obtaining feature data of multiple second user images, performing fusing processing on the feature data of the multiple second user images to obtain second feature data, and storing the second feature data to a database for identity verification.

In addition, the RAM 1003 further stores programs and data required for operations of an apparatus. The CPU 1001 or GPU 1013, the ROM 1002, and the RAM 1003 are connected to each other by means of the communication bus 1004. In the presence of the RAM 1003, the ROM 1002 is an optional module. The RAM 1003 stores executable instructions, or writes the executable instructions to the ROM 1002 during running, where the executable instructions enable the processor to perform corresponding operations of the foregoing communication method. An Input/Output (I/O) interface 1005 is also connected to the communication bus 1004. The communication component 1012 is integrated, or is configured to have multiple sub-modules (for example, multiple IB network cards) linked on the communication bus.

The following parts are connected to the I/O interface 1005: an input section 1006 including a keyboard, a mouse and the like; an output section 1007 including a Cathode-Ray Tube (CRT), a Liquid Crystal Display (LCD), a loudspeaker and the like; a storage section 1008 including hardware and the like; and the communication interface 1009 of the network interface card such as the LAN card and the modem. A drive 1010 is also connected to the I/O interface 1005 according to requirements. A removable medium 1011 such as a magnetic disk, an optical disk, a magneto-optical disk, and a semiconductor memory is installed on the drive 1010 according to requirements, so that a computer program read from the removable medium is installed on the storage section 1008 according to requirements.

It should be noted that, the architecture illustrated in FIG. 10 is merely an optional implementation. During specific practice, the number and types of the parts in FIG. 10 may be selected, decreased, increased, or replaced according to actual requirements. Different functional parts may be separated or integrated or the like. For example, the GPU and the CPU may be separated, or the GPU may be integrated on the CPU, and the communication element may be separated from or integrated on the CPU or the GPU or the like. These alternative implementations all fall within the scope of protection of the present disclosure.

The electronic device according to the embodiments of the present disclosure is configured to implement the corresponding method for processing images in the foregoing embodiments. The parts in the electronic device may be configured to perform the operations in the foregoing method embodiments. For example, the method for processing images described above is implemented by the processor of the electronic device invoking related instructions stored in the memory. For the purpose of concision, details are not repeatedly described herein.

The process described above with reference to the flowchart according to the embodiments of the present disclosure is implemented as a computer program product. For example, the embodiments of the present disclosure include a computer program product, which includes a computer program tangibly included in a machine-readable medium. The computer program includes program codes for executing a method shown in the flowchart. The program code includes corresponding instructions for correspondingly executing operations of the methods provided by the embodiments of the present disclosure, such as obtaining feature data of multiple second user images, performing fusing processing on the feature data of the multiple second user images to obtain second feature data, and storing the second feature data to a database for identity verification. In such embodiments, the computer program is downloaded and installed from a network through the communication element and/or installed from the removable medium 1011. When the computer program is executed by the processor, functions provided in the method according to the embodiments of the present disclosure are executed.

Figure 11:
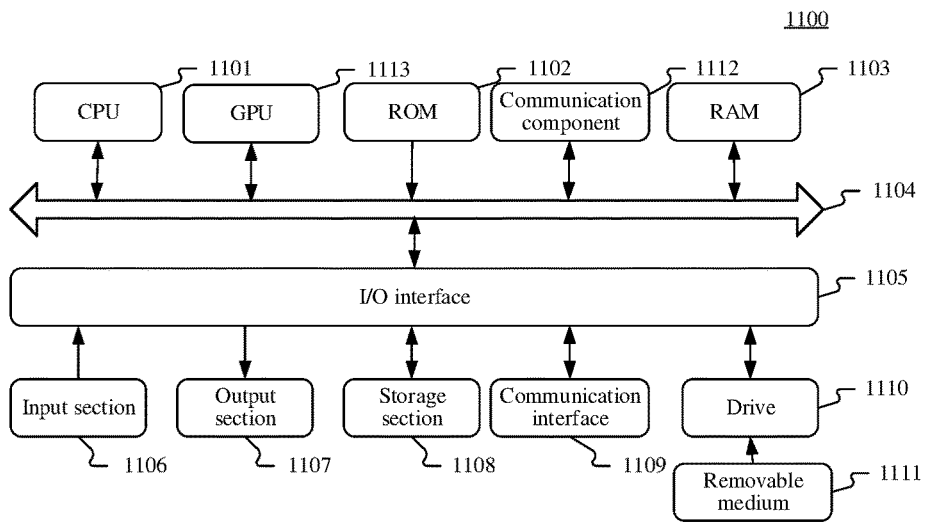
FIG. 11 is yet another schematic structural diagram of an electronic device according to embodiments of the present disclosure.

Embodiments of the present disclosure further provide an electronic device which, for example, is a mobile terminal, a Personal Computer (PC), a tablet computer, a server, and the like. Referring to FIG. 11 below, a schematic structural diagram of an electronic device 1100 suitable for implementing the identity verification apparatus according to the embodiments of the present disclosure is illustrated. As shown in FIG. 11, the electronic device 1100 includes a memory and a processor. Specifically, the electronic device 1100 includes one or more processors, a communication element, and the like. The one or more processors are, for example, one or more Central Processing Units (CPUs) 1101, and/or one or more Graphic Processing Units (GPUs) 1113, or the like, and the processors execute various appropriate actions and processing according to executable instructions stored in a Read-Only Memory (ROM) 1102 or executable instructions loaded from a storage section 1108 to a Random Access Memory (RAM) 1103. The communication element includes a communication component 1112 and/or a communication interface 1109. The communication component 1112 includes but is not limited to a network card, and the network card includes but is not limited to an InfiniBand (IB) network card. The communication interface 1109 includes a communication interface of a network interface card such as an LAN card and a modem, and the communication interface 1109 performs communication processing via a network such as the Internet.

The processors communicate with the ROM 1102 and/or the RAM 1103 to execute executable instructions, are connected to the communication component 1112 by means of a communication bus 1104, and communicate with other target devices by means of the communication component 1112, so as to complete operations corresponding to any method for identity verification provided in the embodiments of the present disclosure, such as obtaining first biological feature data of a user, determining, based on the first biological feature data and at least one piece of second biological feature data included in a database, whether the user passes identity verification, and in the case that the user passes the identity verification, updating the database.

In addition, the RAM 1103 further stores programs and data required for operations of an apparatus. The CPU 1101 or GPU 1113, the ROM 1102, and the RAM 1103 are connected to each other by means of the communication bus 1104. In the presence of the RAM 1103, the ROM 1102 is an optional module. The RAM 1103 stores executable instructions, or writes the executable instructions to the ROM 1102 during running, where the executable instructions enable the processor to perform corresponding operations of the foregoing communication method. An Input/Output (I/O) interface 1105 is also connected to the communication bus 1104. The communication component 1112 is integrated, or is configured to have multiple sub-modules (for example, multiple IB network cards) linked on the communication bus.

The following parts are connected to the I/O interface 1105: an input section 1106 including a keyboard, a mouse and the like; an output section 1107 including a Cathode-Ray Tube (CRT), a Liquid Crystal Display (LCD), a loudspeaker and the like; a storage section 1108 including hardware and the like; and the communication interface 1109 of the network interface card such as the LAN card and the modem. A drive 1110 is also connected to the I/O interface 1105 according to requirements. A removable medium 1111 such as a magnetic disk, an optical disk, a magneto-optical disk, and a semiconductor memory is installed on the drive 1110 according to requirements, so that a computer program read from the removable medium is installed on the storage section 1108 according to requirements.

It should be noted that, the architecture illustrated in FIG. 11 is merely an optional implementation. During specific practice, the number and types of the parts in FIG. 11 may be selected, decreased, increased, or replaced according to actual requirements. Different functional parts may be separated or integrated or the like. For example, the GPU and the CPU may be separated, or the GPU may be integrated on the CPU, and the communication element may be separated from or integrated on the CPU or the GPU or the like. These alternative implementations all fall within the scope of protection of the present disclosure.

The electronic device according to the embodiments of the present disclosure is configured to implement the corresponding method for identity verification in the foregoing embodiments. The parts in the electronic device may be configured to perform the operations in the foregoing method embodiments. For example, the method for identity verification described above is implemented by the processor of the electronic device invoking related instructions stored in the memory. For the purpose of concision, details are not repeatedly described herein.

The process described above with reference to the flowchart according to the embodiments of the present disclosure is implemented as a computer program product. For example, the embodiments of the present disclosure include a computer program product, which includes a computer program tangibly included in a machine-readable medium. The computer program includes program codes for executing a method shown in the flowchart. The program code includes corresponding instructions for correspondingly executing operations of the methods provided by the embodiments of the present disclosure, such as obtaining first biological feature data of a user, determining, based on the first biological feature data and at least one piece of second biological feature data included in a database, whether the user passes identity verification, and in the case that the user passes the identity verification, updating the database. In such embodiments, the computer program is downloaded and installed from a network through the communication element and/or installed from the removable medium 1111. When the computer program is executed by the processor, functions provided in the method according to the embodiments of the present disclosure are executed.

The methods and apparatuses, electronic devices, and storage media according to the present disclosure are implemented in many manners. For example, the methods and apparatuses, electronic devices, and storage media according to the embodiments of the present disclosure are implemented by using software, hardware, firmware, or any combination of software, hardware, and firmware. Unless otherwise specially stated, the foregoing sequences of operations of the methods are merely for description, and are not intended to limit the operations of the methods in the embodiments of the present disclosure. In addition, in some embodiments, the present disclosure may also be implemented as programs recorded in a recording medium. The programs include machine-readable instructions for implementing the methods according to the present disclosure. Therefore, the present disclosure further covers the recording medium storing the programs for executing the methods according to the embodiments of the present disclosure.

The descriptions of the embodiments of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

What is claimed is:

1. A method for processing an image, comprising:
obtaining first feature data of a first user image;
comparing the first feature data with at least one piece of second feature data comprised in a database to obtain a comparison result; and
determining, according to the comparison result, whether to update the database,
wherein when the at least one piece of second feature data refers to multiple pieces of second feature data, the method further comprises:
determining target feature data from the multiple pieces of second feature data based on multiple similarities between the first feature data and the multiple pieces of second feature data; and
updating the target feature data stored in the database based on the first feature data,
wherein the updating the target feature data stored in the database based on the first feature data comprises:
performing fusing processing on the first feature data and the target feature data based on a weight attenuation coefficient to obtain fused feature data.

2. The method according to claim 1, wherein the comparing the first feature data with at least one piece of second feature data comprised in a database to obtain a comparison result comprises:
determining at least one similarity between the first feature data and the at least one piece of second feature data; and
obtaining the comparison result based on the at least one similarity.

3. The method according to claim 2, wherein the obtaining the comparison result based on the at least one similarity comprises:
determining a maximum value in the at least one similarity as the comparison result.

4. The method according to claim 1, wherein the determining, according to the comparison result, whether to update the database comprises:
in response to the comparison result being greater than or equal to a first predetermined threshold, determining to update the database.

5. The method according to claim 4, wherein the first predetermined threshold is greater than a second predetermined threshold for determining whether a user passes image verification.

6. The method according to claim 1, wherein the determining, according to the comparison result, whether to update the database comprises:
in response to the comparison result being less than a second predetermined threshold for determining whether a user passes image verification and being greater than or equal to a third predetermined threshold, prompting the user to perform identity verification by using another verification approach different from an image verification approach; and
in response to the verification in the another verification approach being passed by the user, determining to update the database.

7. The method according to claim 6, wherein the another verification approach comprises at least one of a password verification approach, a fingerprint verification approach, an iris verification approach, or a gesture verification approach.

8. The method according to claim 1, wherein the method further comprises:
in response to determining to update the database, performing fusing processing on the first feature data and the at least one piece of second feature data to obtain at least one piece of updated feature data.

9. The method according to claim 1, wherein when the at least one piece of second feature data refers to one piece of second feature data, before the obtaining first feature data of a first user image, the method further comprises:
obtaining feature data of multiple second user images, and performing fusing processing on the feature data of the multiple second user images to obtain the one piece of second feature data.

10. An electronic device, comprising: a processor and a memory, wherein the memory is configured to store at least one executable instruction, and the at least one executable instruction enables the processor to perform:
obtaining first feature data of a first user image;
comparing the first feature data with at least one piece of second feature data comprised in a database to obtain a comparison result; and
determining, according to the comparison result, whether to update the database, wherein when the at least one piece of second feature data refers to multiple pieces of second feature data, the at least one executable instruction enables the processor to further perform:
  determining target feature data from the multiple pieces of second feature data based on multiple similarities between the first feature data and the multiple pieces of second feature data; and
  updating the target feature data stored in the database based on the first feature data,
  wherein the updating the target feature data stored in the database based on the first feature data comprises:
    performing fusing processing on the first feature data and the target feature data based on a weight attenuation coefficient to obtain fused feature data.

11. A non-transitory computer readable storage medium having computer programs stored thereon, wherein when executed by a processor, the processor is configured to perform:
  obtaining first feature data of a first user image;
  comparing the first feature data with at least one piece of second feature data comprised in a database to obtain a comparison result; and
  determining, according to the comparison result, whether to update the database,
  wherein when the at least one piece of second feature data refers to multiple pieces of second feature data, the processor is further configured to perform:
    determining target feature data from the multiple pieces of second feature data based on multiple similarities between the first feature data and the multiple pieces of second feature data; and
    updating the target feature data stored in the database based on the first feature data,
    wherein the updating the target feature data stored in the database based on the first feature data comprises:
      performing fusing processing on the first feature data and the target feature data based on a weight attenuation coefficient to obtain fused feature data.

12. The electronic device according to claim 10, wherein the comparing the first feature data with at least one piece of second feature data comprised in a database to obtain a comparison result comprises:
  determining at least one similarity between the first feature data and the at least one piece of second feature data; and
  obtaining the comparison result based on the at least one similarity.

13. The electronic device according to claim 12, wherein the obtaining the comparison result based on the at least one similarity comprises:
  determining a maximum value in the at least one similarity as the comparison result.

14. The electronic device according to claim 10, wherein the determining, according to the comparison result, whether to update the database comprises:
  in response to the comparison result being greater than or equal to a first predetermined threshold, determining to update the database.

15. The electronic device according to claim 14, wherein the first predetermined threshold is greater than a second predetermined threshold for determining whether a user passes image verification.

16. The electronic device according to claim 10, wherein the determining, according to the comparison result, whether to update the database comprises:
  in response to the comparison result being less than a second predetermined threshold for determining whether a user passes image verification and being greater than or equal to a third predetermined threshold, prompting the user to perform identity verification by using another verification approach different from an image verification approach; and
  in response to the verification in the another verification approach being passed by the user, determining to update the database.

17. The electronic device according to claim 16, wherein the another verification approach comprises at least one of a password verification approach, a fingerprint verification approach, an iris verification approach, or a gesture verification approach.

18. The electronic device according to claim 10, wherein the at least one executable instruction enables the processor to further perform:
  in response to determining to update the database, performing fusing processing on the first feature data and the at least one piece of second feature data to obtain at least one piece of updated feature data.

19. The electronic device according to claim 10, wherein the at least one piece of second feature data refers to one piece of second feature data; and
  before the obtaining first feature data of a first user image, the at least one executable instruction enables the processor to further perform:
    obtaining feature data of multiple second user images, and
    performing fusing processing on the feature data of the multiple second user images to obtain the one piece of second feature data.

* * * * *